(12) United States Patent
Kamitake et al.

(10) Patent No.: US 12,308,425 B2
(45) Date of Patent: May 20, 2025

(54) POSITIVE-ELECTRODE MATERIAL AND BATTERY

(71) Applicant: Panasonic Intellectual Property Management Co., Ltd., Osaka (JP)

(72) Inventors: Hiroki Kamitake, Osaka (JP); Seiji Nishiyama, Osaka (JP); Izuru Sasaki, Aichi (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 509 days.

(21) Appl. No.: 17/930,426

(22) Filed: Sep. 8, 2022

(65) Prior Publication Data

US 2023/0006196 A1     Jan. 5, 2023

Related U.S. Application Data

(63) Continuation of application No. PCT/JP2021/010465, filed on Mar. 15, 2021.

(30) Foreign Application Priority Data

Apr. 2, 2020   (JP) .................................. 2020-066870

(51) Int. Cl.
*H01M 4/36*     (2006.01)
*H01M 4/505*    (2010.01)
(Continued)

(52) U.S. Cl.
CPC ............. *H01M 4/366* (2013.01); *H01M 4/62* (2013.01); *H01M 10/0562* (2013.01);
(Continued)

(58) Field of Classification Search
None
See application file for complete search history.

(56) References Cited

U.S. PATENT DOCUMENTS

2016/0079597 A1    3/2016  Fujiki et al.
2016/0315324 A1*  10/2016  Miki ..................... H01M 4/525
(Continued)

FOREIGN PATENT DOCUMENTS

EP      3089242 A1    11/2016
JP   2016-062683 A     4/2016
(Continued)

OTHER PUBLICATIONS

International Search Report of PCT application No. PCT/JP2021/010465 dated May 18, 2021.
(Continued)

*Primary Examiner* — Carlos Barcena
(74) *Attorney, Agent, or Firm* — Rimon P.C.

(57) ABSTRACT

A positive-electrode material according to the present disclosure includes a positive-electrode active material and a coating layer covering the positive-electrode active material, wherein the coating layer contains lithium and carbon, the positive-electrode active material and the coating layer constitute a coated active material, and the ratio C/Li of the carbon content to the lithium content in a surface layer portion of the coated active material is 3.27 or more based on the atomic ratio.

13 Claims, 1 Drawing Sheet (51) Int. Cl.
  *H01M 4/525* (2010.01)
  *H01M 4/62* (2006.01)
  *H01M 10/0562* (2010.01)
  *H01M 4/02* (2006.01)

(52) U.S. Cl.
  CPC ...... *H01M 2004/028* (2013.01); *H01M 4/505* (2013.01); *H01M 4/525* (2013.01); *H01M 2300/008* (2013.01)

(56) References Cited

U.S. PATENT DOCUMENTS

2020/0328459 A1  10/2020  Sakai et al.
2020/0328467 A1  10/2020  Sasaki et al.

FOREIGN PATENT DOCUMENTS

WO  2019/135319 A1  7/2019
WO  2019/135322     7/2019

OTHER PUBLICATIONS

EPC Office Action dated Aug. 30, 2023 for the related European Patent Application No. 21781154.6.
Li Xuelei et al: "Outstanding electrochemical performances of the all-solid-state lithium battery using Ni-rich layered oxide cathode and sulfide electrolyte", Journal of Power Sources, Elsevier, Amsterdam, NL, vol. 456, Mar. 9, 2020 (Mar. 9, 2020), XP086103902.

* cited by examiner

POSITIVE-ELECTRODE MATERIAL AND BATTERY

BACKGROUND

1. Technical Field

The present disclosure relates to a positive-electrode material and a battery.

2. Description of the Related Art

International Publication No. WO 2019/135322 discloses an all-solid-state battery using a positive-electrode active material coated with a coating material.

SUMMARY

In the related art, there is a demand for a battery with a further improved discharge voltage.

In one general aspect, the techniques disclosed here feature a positive-electrode material including: a positive-electrode active material; and a coating layer covering the positive-electrode active material, wherein the coating layer contains lithium and carbon, the positive-electrode active material and the coating layer constitute a coated active material, and a ratio C/Li of a carbon content to a lithium content in a surface layer portion of the coated active material is 3.27 or more based on an atomic ratio.

The present disclosure can improve the discharge voltage of a battery.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTIONS

Outline of One Aspect of the Present Disclosure

A positive-electrode material according to a first aspect of the present disclosure includes:

a positive-electrode active material; and
a coating layer covering the positive-electrode active material,
wherein the coating layer contains lithium and carbon,
the positive-electrode active material and the coating layer constitute a coated active material, and
a ratio C/Li of a carbon content to a lithium content in a surface layer portion of the coated active material is 3.27 or more based on an atomic ratio.

The first aspect can improve the discharge voltage of a battery.

According to a second aspect of the present disclosure, for example, in the positive-electrode material according to the first aspect, the coating layer may contain a carbonate. The second aspect can improve the potential stability of the coating layer and improve the discharge voltage of a battery.

According to a third aspect of the present disclosure, for example, the positive-electrode material according to the first or second aspect may further contain a solid electrolyte. The third aspect can improve ionic conductivity at a positive electrode.

According to a fourth aspect of the present disclosure, for example, the solid electrolyte in the positive-electrode material according to the third aspect may be represented by the composition formula $Li_\alpha M_\beta X_\gamma$, where $\alpha$, $\beta$, and $\gamma$ may independently be more than 0, M may contain at least one element selected from the group consisting of metal elements other than Li and metalloid elements, and X may contain at least one selected from the group consisting of F, Cl, Br, and I. The fourth aspect can improve the output density of a battery. The fourth aspect can also improve the thermal stability of a battery and reduce the generation of noxious gases, such as hydrogen sulfide.

According to a fifth aspect of the present disclosure, for example, the M in the positive-electrode material according to the fourth aspect may contain yttrium.

According to a sixth aspect of the present disclosure, for example, the positive-electrode material according to the fourth or fifth aspect may satisfy $2.5 \leq \alpha \leq 3$, $1 \leq \beta \leq 1.1$, and $\gamma = 6$.

According to a seventh aspect of the present disclosure, for example, the X in the positive-electrode material according to any one of the fourth to sixth aspects may contain at least one selected from the group consisting of Cl and Br.

The fifth to seventh aspects can further improve the ionic conductivity of the solid electrolyte. This improves the output density of a battery.

According to an eighth aspect of the present disclosure, for example, the coating layer in the positive-electrode material according to any one of the first to seventh aspects may contain a lithium niobate compound. The eighth aspect can further improve the charge-discharge efficiency of a battery.

According to a ninth aspect of the present disclosure, for example, the positive-electrode active material in the positive-electrode material according to any one of the first to eighth aspects may contain Li and at least one element selected from the group consisting of Mn, Co, Ni, and Al. The ninth aspect can further increase the energy density of a battery.

A battery according to a tenth aspect of the present disclosure includes:

a positive electrode containing the positive-electrode material according to any one of the first to ninth aspects;
an negative electrode; and
an electrolyte layer between the positive electrode and the negative electrode.

The tenth aspect can improve the discharge voltage of a battery.

According to an eleventh aspect of the present disclosure, for example, in the battery according to the tenth aspect, the positive-electrode material may further contain a solid electrolyte, and the electrolyte layer may contain a solid electrolyte with the same composition as that of the solid electrolyte contained in the positive-electrode material. The eleventh aspect can further improve the charge-discharge efficiency of a battery.

According to a twelfth aspect of the present disclosure, for example, in the battery according to the tenth or eleventh aspect, the positive-electrode material may further contain a solid electrolyte, and the electrolyte layer may contain a halide solid electrolyte with a composition different from that of the solid electrolyte contained in the positive-electrode material. The twelfth aspect can improve the output density and charge-discharge efficiency of a battery.

According to a thirteenth aspect of the present disclosure, for example, the electrolyte layer in the battery according to any one of the tenth to twelfth aspects may contain a sulfide solid electrolyte. The thirteenth aspect can utilize a low-potential negative-electrode material, such as graphite or metallic lithium, and can improve the energy density of a battery.

Embodiments of the present disclosure are described below with reference to the accompanying drawings.

First Embodiment

Figure 1:
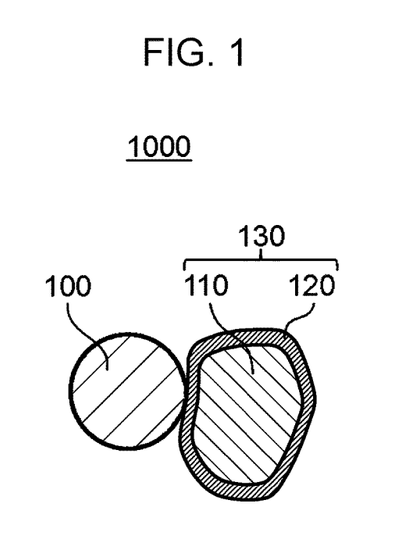
FIG. 1 is a schematic cross-sectional view of a positive-electrode material 1000 according to a first embodiment.

FIG. 1 is a schematic cross-sectional view of a positive-electrode material 1000 according to a first embodiment.

The positive-electrode material 1000 according to the first embodiment includes a coated active material 130 and a solid electrolyte 100.

The coated active material 130 includes a positive-electrode active material 110 and a coating layer 120. The coating layer 120 is located on the surface of the positive-electrode active material 110. The coating layer 120 is a layer containing a coating material. The positive-electrode active material 110 is covered with the coating material.

The coating layer 120 contains lithium and carbon.

The ratio C/Li of the carbon content to the lithium content in a surface layer portion of the coated active material 130 is 3.27 or more based on the atomic ratio. The phrase "surface layer portion of the coated active material 130" refers to a portion from the outermost surface to a predetermined depth position of the coated active material 130. The "predetermined depth position" may be a position at which composition information can be acquired by a method for analyzing a surface composition. For example, the coating layer 120 with a thickness exceeding the penetration depth of soft X-rays or an electron beam used in the composition analysis is regarded as the "surface layer portion of the coated active material 130". When the coating layer 120 has a smaller thickness than the penetration depth of soft X-rays or an electron beam used in the composition analysis, part of the positive-electrode active material 110 and the coating layer 120 are included in the "surface layer portion of the coated active material 130".

The positive-electrode active material 110 is separated from the solid electrolyte 100 by the coating layer 120. The positive-electrode active material 110 may not be in direct contact with the solid electrolyte 100. This is because the coating layer 120 has ionic conductivity.

Such a structure can improve the discharge voltage of a battery.

International Publication No. WO 2019/135322 discloses that an oxidative decomposition side reaction of extracting electrons from a solid electrolyte in contact with a positive-electrode active material occurs while charging and forms an oxidized layer with low lithium ion conductivity between the positive-electrode active material and the solid electrolyte, thereby increasing the interfacial resistance. It is also mentioned that a coating layer can be formed between the positive-electrode active material and the solid electrolyte to reduce the formation of the oxidized layer and reduce the increase in interfacial resistance. However, the surface composition of the coating layer is not clarified.

On the other hand, as a result of extensive studies, the present inventors have found the problem that battery operation changes the composition of a surface layer portion of a coated active material including a coating layer and a positive-electrode active material, increases the interfacial resistance, and decreases the discharge voltage. As a result of further detailed investigation, the present inventors have found that intentionally increasing the ratio (C/Li) of the carbon content to the lithium content in a surface layer portion of a coated active material improves the discharge voltage.

The coating layer 120 may contain a carbonate as a coating material. An increase in the ratio (C/Li) of the surface layer portion of the coated active material 130 results in a decrease in the lithium content of a carbonate (for example, lithium carbonate, lithium hydrogen carbonate, etc.) contained in the coating layer 120. A decrease in the lithium content results in the coating layer 120 with improved potential stability. The coating layer 120 with improved potential stability further reduces the formation of an oxidized layer between the coated active material 130 and the solid electrolyte 100 and decreases the interfacial resistance in an electrode reaction. This can improve the discharge voltage of a battery.

The effect of improving the potential stability of the coating layer 120 is expected to reduce not only the formation of an oxidized layer of the solid electrolyte but also the oxidation of the electrolyte solution. Thus, the technique of the present disclosure is also effective in a battery containing an electrolyte solution.

The ratio (C/Li) may be controlled by any method. For example, the coated active material 130 is heat-treated in an oxygen atmosphere and is then recovered in an atmosphere with a dew point of −30° C. or less. The oxygen atmosphere may be a pure oxygen atmosphere. The heat treatment conditions and the atmospheric conditions for taking out the coated active material 130 from the heat treatment apparatus after the heat treatment can be appropriately selected on the basis of the compositions of the positive-electrode active material 110 and the coating layer 120.

The surface composition of the coated active material 130 may be analyzed by X-ray photoelectron spectroscopy (XPS) or electron energy-loss spectroscopy (EELS). The method for analyzing a surface composition is appropriately selected according to the composition of the coating material contained in the coating layer 120 and the coating state of the positive-electrode active material 110. Surface composition analysis using XPS is less likely to be local analysis and can examine a relatively large area of the surface of a material. XPS is suitable as a surface composition analysis method because average surface composition information at a depth of 10 nm from the outermost surface can be acquired and because the quality control of the material is easy.

The ratio (C/Li) may be 3.72 or more and 50 or less. A ratio (C/Li) of 50 or less results in a sufficient Li content of the carbonate. This can reduce the decrease in the Li ionic conductivity and consequently reduce the increase in the internal resistance of the positive-electrode material 1000. The positive-electrode material 1000 with a smaller increase in the internal resistance enables a battery to operate at high output power. The ratio (C/Li) may be 3.72 or more and 6.83 or less. A ratio (C/Li) in such a range can result in a smaller increase in interfacial resistance due to an electrode reaction and can result in the coating layer 120 with high Li ionic conductivity. This further improves the discharge voltage of a battery.

The solid electrolyte 100 may be a halide solid electrolyte.

The halide solid electrolyte is represented by the following composition formula (1), for example. In the composition formula (1), α, β, and γ are independently more than 0. M includes at least one element selected from the group consisting of metal elements other than Li and metalloid elements. X includes at least one selected from the group consisting of F, Cl, Br, and I.

formula (1)

$$Li_\alpha M_\beta X_\gamma$$

The metalloid elements include B, Si, Ge, As, Sb, and Te. The metal elements include all group 1 to 12 elements of the periodic table except hydrogen and all group 13 to 16 elements except B, Si, Ge, As, Sb, Te, C, N, P, O, S, and Se. Thus, the metal elements are a group of elements that can become a cation when forming an inorganic compound with a halide.

The halide solid electrolyte may be $Li_3YX_6$, $Li_2MgX_4$, $Li_2FeX_4$, $Li(Al, Ga, In)X_4$, or $Li_3(Al, Ga, In)X_6$.

Such a structure can improve the output density of a battery. Such a structure can also improve the thermal stability of a battery and reduce the generation of noxious gases, such as hydrogen sulfide.

In the present disclosure, an element represented by, for example, "(Al, Ga, In)" in the formula refers to at least one element selected from the group of elements in parentheses. More specifically, "(Al, Ga, In)" is synonymous with "at least one selected from the group consisting of Al, Ga, and In". The same applies to other elements. The halide solid electrolyte has good ionic conductivity. The halide solid electrolyte may not contain sulfur.

In the composition formula (1), M may contain Y (=yttrium). Thus, the solid electrolyte 100 may contain Y as a metal element.

The composition formula (1) may satisfy $2.5 \leq \alpha \leq 3$, $1 \leq \beta \leq 1.1$, and $\gamma = 6$.

In the composition formula (1), X may include at least one selected from the group consisting of Cl and Br.

Such a structure can further improve the ionic conductivity of the solid electrolyte 100. This improves the output density of a battery.

A halide solid electrolyte containing Y may be a compound represented by the following composition formula (2).

formula (2)

$$Li_a M_b Y_c X_6$$

The composition formula (2) satisfies $a+mb+3c=6$ and $c>0$. In the composition formula (2), M includes at least one element selected from the group consisting of metal elements other than Li and Y and metalloid elements. m denotes the valence of M. X includes at least one selected from the group consisting of F, Cl, Br, and I. M includes at least one selected from the group consisting of Mg, Ca, Sr, Ba, Zn, Sc, Al, Ga, Bi, Zr, Hf, Ti, Sn, Ta, and Nb. More specifically, the halide solid electrolyte containing Y may be $Li_3YF_6$, $Li_3YCl_6$, $Li_3YBr_6$, $Li_3YI_6$, $Li_3YBrCl_5$, $Li_3YBr_3Cl_3$, $Li_3YBr_5Cl$, $Li_3YBr_5I$, $Li_3YBr_3I_3$, $Li_3YBrI_5$, $Li_3YClI_5$, $Li_3YCl_3I_3$, $Li_3YCl_5I$, $Li_3YBr_2Cl_2I_2$, $Li_3YBrCl_4I$, $Li_{2.7}Y_{1.1}Cl_6$, $Li_{2.5}Y_{0.5}Zr_{0.5}Cl_6$, or $Li_{2.5}Y_{0.3}Zr_{0.7}Cl_6$.

Such a structure can further improve the output density of a battery.

The solid electrolyte 100 may contain a sulfide solid electrolyte.

The sulfide solid electrolyte may be $Li_2S$—$P_2S_5$, $Li_2S$—$SiS_2$, $Li_2S$—$B_2S_3$, $Li_2S$—$GeS_2$, $Li_{3.25}Ge_{0.25}P_{0.75}S_4$, or $Li_{10}GeP_2S_{12}$. LiX, $Li_2O$, $MO_q$, and $Li_pMO_q$ may be added to these. The element X in "LiX" denotes at least one element selected from the group consisting of F, Cl, Br, and I. The element M in "$MO_q$" and "$Li_pMO_q$" denotes at least one element selected from the group consisting of P, Si, Ge, B, Al, Ga, In, Fe, and Zn. p and q in "$MO_q$" and "$Li_pMO_q$" independently denote a natural number.

Such a structure can improve the output density of a battery.

The solid electrolyte 100 may contain at least one selected from the group consisting of solid oxide electrolytes, solid polymer electrolytes, and complex hydride solid electrolytes.

Examples of the solid oxide electrolytes include NASICON-type solid electrolytes, such as $LiTi_2(PO_4)_3$ and element-substituted products thereof, $(LaLi)TiO_3$ perovskite solid electrolytes, LISICON-type solid electrolytes, such as $Li_{14}ZnGe_4O_{16}$, $Li_4SiO_4$, $LiGeO_4$, and element-substituted products thereof, garnet-type solid electrolytes, such as $Li_7La_3Zr_2O_{12}$ and element-substituted products thereof, $Li_3N$ and H-substituted products thereof, $Li_3PO_4$ and N-substituted products thereof, and glasses and glass ceramics in which $Li_2SO_4$, $Li_2CO_3$, or the like is added to a base material containing a Li—B—O compound, such as $LiBO_2$ or $Li_3BO_3$.

Examples of the solid polymer electrolytes include compounds of a polymer and a lithium salt. The polymer may have an ethylene oxide structure. A polymer with an ethylene oxide structure can have a high lithium salt content and can have further increased ionic conductivity. The lithium salt may be $LiPF_6$, $LiBF_4$, $LiSbF_6$, $LiAsF_6$, $LiSO_3CF_3$, $LiN(SO_2CF_3)_2$, $LiN(SO_2C_2F_5)_2$, $LiN(SO_2CF_3)(SO_2C_4F_9)$, or $LiC(SO_2CF_3)_3$. The lithium salt may be a lithium salt selected from these or a mixture of two or more lithium salts selected from these.

The complex hydride solid electrolyte may be $LiBH_4$—LiI or $LiBH_4$—$P_2S_5$, for example.

Such a structure can improve the output density of a battery.

The positive-electrode active material 110 according to the first embodiment may be a lithium-containing transition metal oxide, a transition metal fluoride, a polyanionic material, a fluorinated polyanionic material, a transition metal sulfide, a transition metal oxysulfide, or a transition metal oxynitride, for example. In particular, the use of a lithium-containing transition metal oxide as the positive-electrode active material 110 can reduce production costs and increase the average discharge voltage.

The positive-electrode active material 110 may contain Li and at least one element selected from the group consisting of Mn, Co, Ni, and Al. Such a material may be $Li(NiCoAl)O_2$, $Li(NiCoMn)O_2$, or $LiCoO_2$.

The positive-electrode active material 110 may contain a single active material or a plurality of active materials with different compositions.

In the first embodiment, the positive-electrode active material 110 may be $Li(NiCoMn)O_2$.

Such a structure can further increase the energy density of a battery.

The positive-electrode active material 110 is in the form of particles, for example. The positive-electrode active material 110 may have any particle shape. The positive-electrode active material 110 may have a particle shape, such as spherical, ellipsoidal, flaky, or fibrous.

The coating material in the coating layer 120 may be a material with low electronic conductivity. The coating material may be an oxide material, a solid oxide electrolyte, or a carbonate.

The oxide material may be $SiO_2$, $Al_2O_3$, $TiO_2$, $B_2O_3$, $Nb_2O_5$, $WO_3$, or $ZrO_2$, for example. The solid oxide electrolyte may be a Li—Nb—O compound, such as $LiNbO_3$, a Li—B—O compound, such as $LiBO_2$ or $Li_3BO_3$, a Li—Al—O compound, such as $LiAlO_2$, a Li—Si—O compound, such as $Li_4SiO_4$, a Li—S—O compound, such as $Li_2SO_4$, a Li—Ti—O compound, such as $Li_4Ti_5O_{12}$, a Li—Zr—O compound, such as $Li_2ZrO_3$, a Li—Mo—O compound, such as $Li_2MoO_3$, a Li—V—O compound, such as $LiV_2O_5$, or a Li—W—O compound, such as $Li_2WO_4$, for example.

In the first embodiment, the coating material may be a solid oxide electrolyte.

Solid oxide electrolytes have high ionic conductivity and high high-potential stability. Thus, the use of a solid oxide electrolyte can further improve the charge-discharge efficiency of a battery.

In the first embodiment, the coating layer 120 may contain a lithium niobate compound as a coating material. The coating material may be $LiNbO_3$. The lithium niobate compound is a compound containing lithium, niobium, and oxygen.

$LiNbO_3$ has higher ionic conductivity and higher high-potential stability. Thus, the use of $LiNbO_3$ can further improve the charge-discharge efficiency of a battery.

In the first embodiment, the coating material may be a carbonate.

Due to their low electronic conductivity, carbonates can reduce the degradation of a contact interface between an active material and a solid electrolyte. Examples of the carbonates include lithium carbonate and lithium hydrogen carbonate. One carbonate may be used alone, or a mixture of two or more carbonates may be used.

The coating layer 120 may contain a mixture containing a carbonate and a coating material other than carbonates. The use of the mixture in the coating layer 120 may have an effect of reducing the increase in interfacial resistance or facilitate the control of the ionic conductivity of the coating layer 120. This enables the structure of the positive-electrode material 1000 to be more widely designed.

The coating layer 120 may have a thickness of 1 nm or more and 100 nm or less.

The coating layer 120 with a thickness of 1 nm or more can prevent direct contact between the positive-electrode active material 110 and the solid electrolyte 100 and can prevent a side reaction of the solid electrolyte. This can improve charge-discharge efficiency.

The coating layer 120 with a thickness of 100 nm or less is not too thick. This can sufficiently decrease the internal resistance of a battery. This can increase the energy density of a battery. The thickness of the coating layer 120 can be determined by forming a thin piece of the coated active material 130 by ion milling or the like and observing a cross section of the coated active material 130 with a transmission electron microscope.

The coating layer 120 may uniformly cover the particles of the positive-electrode active material 110. This can prevent direct contact between particles of the positive-electrode active material 110 and particles of the solid electrolyte 100 and prevent a side reaction of the solid electrolyte 100. This can improve charge-discharge efficiency.

Alternatively, the coating layer 120 may cover only part of the surface of the particles of the positive-electrode active material 110. Direct contact between portions without the coating layer 120 in the particles of the positive-electrode active material 110 improves the electronic conductivity between the particles of the positive-electrode active material 110. This enables a battery to operate at high output power.

The solid electrolyte 100 according to the first embodiment may have any shape, for example, acicular, spherical, or ellipsoidal. For example, the solid electrolyte 100 may be in the form of particles.

For example, the solid electrolyte 100 according to the first embodiment in the form of particles (for example, spherical) may have a median size of 100 μm or less.

When the solid electrolyte 100 has a median size of 100 μm or less, the coated active material 130 and the solid electrolyte 100 can form a good dispersion state in the positive-electrode material 1000. This improves the charge-discharge characteristics of a battery.

In the first embodiment, the solid electrolyte 100 may have a median size of 10 μm or less.

Such a structure enables the coated active material 130 and the solid electrolyte 100 in the positive-electrode material 1000 to form a good dispersion state.

In the first embodiment, the solid electrolyte 100 may have a smaller median size than the coated active material 130.

Such a structure enables the solid electrolyte 100 and the coated active material 130 in the positive-electrode material 1000 to form a better dispersion state.

The coated active material 130 may have a median size of 0.1 μm or more and 100 μm or less.

When the coated active material 130 has a median size of 0.1 μm or more, the coated active material 130 and the solid electrolyte 100 in the positive-electrode material 1000 can form a good dispersion state. This improves the charge-discharge characteristics of a battery.

In the coated active material 130 with a median size of 100 μm or less, lithium can have a sufficient diffusion rate. This enables a battery to operate at high output power.

The coated active material 130 may have a larger median size than the solid electrolyte 100. This enables the coated active material 130 and the solid electrolyte 100 to form a good dispersion state.

In the positive-electrode material 1000 according to the first embodiment, as illustrated in FIG. 1, a particle of the solid electrolyte 100 may be in contact with a particle of the coated active material 130. In such a structure, the coating layer 120 is in contact with the positive-electrode active material 110.

The positive-electrode material 1000 according to the first embodiment may contain a plurality of particles of the solid electrolyte 100 and a plurality of particles of the coated active material 130.

In the positive-electrode material 1000, the amount of the solid electrolyte 100 may be the same as or different from the amount of the coated active material 130.

The term "median size", as used herein, refers to the particle size at which the cumulative volume in the volumetric particle size distribution is 50%. The volumetric particle size distribution is measured with a laser diffraction measuring apparatus or an image analyzer, for example.

Next, a method for producing the positive-electrode material 1000 is described below.

First, a powder of the positive-electrode active material 110 is prepared. The powder of the positive-electrode active material 110 is synthesized by a solid phase method, for example. In the solid phase method, a plurality of raw powders are mixed and heat-treated to produce a powder of the positive-electrode active material 110. Furthermore, powders of the positive-electrode active material 110 with various compositions are commercially available and are readily available.

The coating layer 120 is then formed on the surface of the particles of the positive-electrode active material 110. The coating layer 120 may be formed by any method. The coating layer 120 may be formed by a liquid phase coating method or a gas phase coating method.

For example, in the liquid phase coating method, a precursor solution of an ion-conducting material is applied to the surface of the positive-electrode active material 110. To form the coating layer 120 containing $LiNbO_3$, the precursor solution may be a mixed solution (sol solution) of a solvent, a lithium alkoxide, and a niobium alkoxide. The lithium alkoxide may be lithium ethoxide. The niobium alkoxide may be niobium ethoxide. The solvent is an alcohol, such as ethanol, for example. The amounts of lithium alkoxide and niobium alkoxide are adjusted to the target composition of the coating layer 120. If necessary, water may be added to the precursor solution. The precursor solution may be acidic or alkaline.

The precursor solution may be applied to the surface of the positive-electrode active material 110 by any method. For example, the precursor solution can be applied to the surface of the positive-electrode active material 110 using a tumbling granulation coating apparatus. In the tumbling granulation coating apparatus, the precursor solution can be sprayed over and applied to the surface of the positive-electrode active material 110 while tumbling the positive-electrode active material 110. Thus, a precursor film is formed on the surface of the positive-electrode active material 110. The positive-electrode active material 110 covered with the precursor film is heat-treated. The heat treatment promotes the gelation of the precursor film and forms the coating layer 120. Thus, the coated active material 130 is prepared. At this point, the coating layer 120 covers almost the entire surface of the positive-electrode active material 110. The coating layer 120 has an almost uniform thickness.

The gas phase coating method may be a pulsed laser deposition (PLD) method, a vacuum deposition method, a sputtering method, a chemical vapor deposition (CVD) method, or a plasma chemical vapor deposition method. For example, in the PLD method, an ion-conducting material serving as a target is irradiated with a high-energy pulsed laser (for example, KrF excimer laser, wavelength: 248 nm) to deposit the sublimated ion-conducting material on the surface of the positive-electrode active material 110. To form the coating layer 120 of $LiNbO_3$, $LiNbO_3$ sintered to a high density is used as a target.

The coated active material 130 is then treated to adjust the ratio (C/Li). For example, the coated active material 130 is heat-treated in an oxygen atmosphere and is then recovered in an atmosphere with a dew point of −30° C. or less. The oxygen atmosphere may be a pure oxygen atmosphere. The heat treatment conditions and the atmospheric conditions for taking out the coated active material 130 from the heat treatment apparatus after the heat treatment can be appropriately selected on the basis of the compositions of the positive-electrode active material 110 and the coating layer 120. The heat treatment temperature is 150° C. or more and 1000° C. or less, for example. The heat treatment time is 1 hour or more and 72 hours or less, for example. The heat treatment may be followed by a treatment for regrinding the coated active material 130. For example, the ratio (C/Li) tends to increase with the heat treatment temperature.

The pure oxygen atmosphere may be formed by the following method, for example. The chamber is purged with oxygen gas with a purity of 99% or more to decrease the volume concentration of gases other than the oxygen gas to less than 1%. The pressure of the pure oxygen atmosphere is equal to atmospheric pressure, for example.

The positive-electrode material 1000 with a desired ratio (C/Li) is produced through these steps.

Second Embodiment

A second embodiment is described below. The description overlapping with the first embodiment is omitted when deemed unnecessary.

Figure 2:
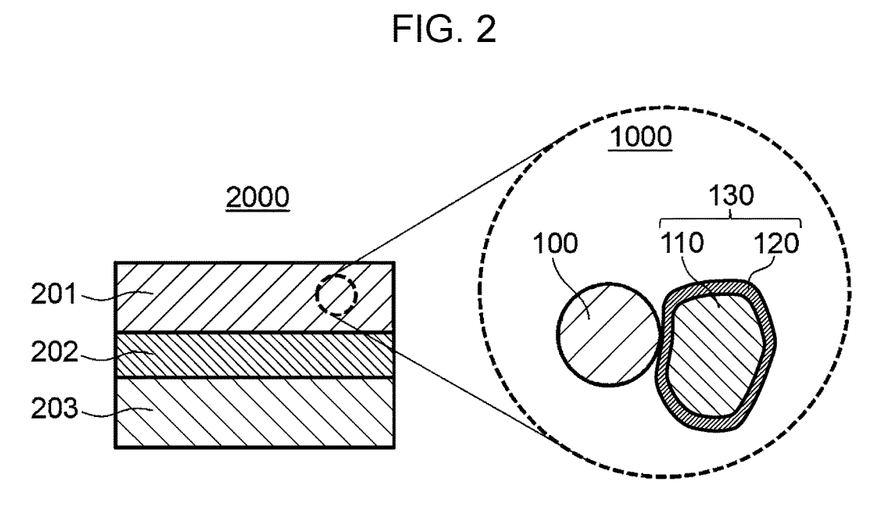
FIG. 2 is a schematic cross-sectional view of a battery 2000 according to a second embodiment.

FIG. 2 is a schematic cross-sectional view of a battery 2000 according to the second embodiment.

The battery 2000 according to the second embodiment includes a positive electrode 201, an electrolyte layer 202, and a negative electrode 203.

The positive electrode 201 contains the positive-electrode material 1000.

The electrolyte layer 202 is located between the positive electrode 201 and the negative electrode 203.

Such a structure can improve the discharge voltage of the battery 2000.

The volume ratio "v1:100−v1" of the coated active material 130 to the solid electrolyte 100 in the positive electrode 201 may satisfy 30≤v1≤95. Satisfying 30≤v1 provides the battery 2000 with a sufficient energy density. Satisfying v1≤95 enables operation at high output power.

The positive electrode 201 may have a thickness of 10 μm or more and 500 μm or less. The positive electrode 201 with a thickness of 10 μm or more provides the battery 2000 with a sufficient energy density. The positive electrode 201 with a thickness of 500 μm or less enables operation at high output power.

The electrolyte layer 202 contains an electrolyte. The electrolyte is a solid electrolyte, for example. Thus, the electrolyte layer 202 may be a solid electrolyte layer. The solid electrolyte may be the material exemplified in the first embodiment. Thus, the electrolyte layer 202 may contain a solid electrolyte with the same composition as that of the solid electrolyte contained in the positive-electrode material 1000.

Such a structure can further improve the charge-discharge efficiency of the battery 2000.

Alternatively, the electrolyte layer 202 may contain a halide solid electrolyte with a composition different from that of the solid electrolyte contained in the positive-electrode material 1000.

Such a structure can improve the output density and charge-discharge efficiency of the battery 2000.

The electrolyte layer 202 may contain a sulfide solid electrolyte.

Such a structure contains a sulfide solid electrolyte with high reduction stability, enables the use of a low-potential negative-electrode material, such as graphite or metallic lithium, and can improve the energy density of the battery 2000.

A sulfide solid electrolyte for the electrolyte layer 202 may be the sulfide solid electrolyte exemplified in the first embodiment.

The electrolyte layer 202 may contain at least one selected from the group consisting of solid oxide electrolytes, solid polymer electrolytes, and complex hydride solid electrolytes. Examples of these materials are also described in the first embodiment.

The electrolyte layer 202 may contain only one solid electrolyte selected from the group consisting of the solid electrolytes described above or may contain two or more solid electrolytes selected from the group consisting of the solid electrolytes. The plurality of solid electrolytes have different compositions. For example, the electrolyte layer 202 may contain a halide solid electrolyte and a sulfide solid electrolyte.

The electrolyte layer 202 may have a thickness of 1 μm or more and 300 μm or less. The electrolyte layer 202 with a thickness of 1 μm or more tends to prevent a short circuit between the positive electrode 201 and the negative electrode 203. The electrolyte layer 202 with a thickness of 300 μm or less enables operation at high output power.

The negative electrode 203 contains a material that can adsorb and desorb metal ions (for example, lithium ions). The negative electrode 203 contains a negative-electrode active material, for example.

The negative-electrode active material may be a metallic material, carbon material, oxide, nitride, tin compound, or silicon compound. The metallic material may be a single metal. Alternatively, the metallic material may be an alloy. Examples of the metallic material include lithium metal and lithium alloys. Examples of the carbon material include natural graphite, coke, carbon during graphitization, carbon fiber, spherical carbon, artificial graphite, and amorphous carbon. Silicon (Si), tin (Sn), silicon compounds, and tin compounds can be suitably used in terms of capacity density.

The negative electrode 203 may contain a solid electrolyte. Such a structure increases lithium ion conductivity in the negative electrode 203 and enables operation at high output power. The solid electrolyte may be the material exemplified in the first embodiment.

The negative-electrode active material may have a median size of 0.1 μm or more and 100 μm or less. When the negative-electrode active material has a median size of 0.1 μm or more, the negative-electrode active material and the solid electrolyte in the negative electrode 203 can form a good dispersion state. This improves the charge-discharge characteristics of the battery 2000. In the negative-electrode active material with a median size of 100 μm or less, lithium can have a sufficient diffusion rate. This enables the battery 2000 to operate at high output power.

The negative-electrode active material may have a larger median size than the solid electrolyte contained in the negative electrode 203. This enables the negative-electrode active material and the solid electrolyte to form a good dispersion state.

When the volume ratio of the negative-electrode active material to the solid electrolyte in the negative electrode 203 is represented by "v2:100−v2", the volume ratio v2 of the negative-electrode active material may satisfy 30≤v2≤95. Satisfying 30≤v2 provides the battery 2000 with a sufficient energy density. Satisfying v2≤95 enables operation at high output power.

The negative electrode 203 may have a thickness of 10 μm or more and 500 μm or less. The negative electrode 203 with a thickness of 10 μm or more provides the battery 2000 with a sufficient energy density. The negative electrode 203 with a thickness of 500 μm or less enables operation at high output power.

At least one of the positive electrode 201, the electrolyte layer 202, or the negative electrode 203 may contain a binder to improve adhesion between particles. The binder is used to improve the binding property of a material constituting the electrode. Examples of the binder include poly (vinylidene difluoride), polytetrafluoroethylene, polyethylene, polypropylene, aramid resin, polyamide, polyimide, polyamideimide, polyacrylonitrile, poly(acrylic acid), poly (methyl acrylate), poly(ethyl acrylate), poly(hexyl acrylate), poly(methacrylic acid), poly(methyl methacrylate), poly (ethyl methacrylate), poly(hexyl methacrylate), poly(vinyl acetate), polyvinylpyrrolidone, polyether, poly(ether sulfone), hexafluoropolypropylene, styrene-butadiene rubber, and carboxymethylcellulose. The binder may also be a copolymer of two or more materials selected from the group consisting of tetrafluoroethylene, hexafluoroethylene, hexafluoropropylene, perfluoroalkyl vinyl ether, vinylidene fluoride, chlorotrifluoroethylene, ethylene, propylene, pentafluoropropylene, fluoromethyl vinyl ether, acrylic acid, and hexadiene. A mixture of two or more selected from these may also be used as a binder.

At least one of the positive electrode 201 or the negative electrode 203 may contain a conductive aid to increase electronic conductivity. Examples of the conductive aid include graphite, such as natural graphite and artificial graphite, carbon black, such as acetylene black and Ketjen black, electrically conductive fiber, such as carbon fiber and metal fiber, metal powders, such as fluorocarbon and aluminum, electrically conductive whiskers, such as zinc oxide and potassium titanate, electrically conductive metal oxides, such as titanium oxide, and electrically conductive polymers, such as polyaniline, polypyrrole, and polythiophene. The use of a carbon conductive aid can reduce costs.

The battery 2000 according to the second embodiment may be of a coin type, a cylindrical type, a square or rectangular type, a sheet type, a button type, a flat type, a layered type, or the like.

EXAMPLES

The present disclosure is described in detail in the following examples and comparative examples.

Example 1

[Preparation of Halide Solid Electrolyte]

In an argon glove box with a dew point of −60° C. or less, a LiCl powder, a LiBr powder, and a $YCl_3$ powder were weighed in a mole ratio of $LiCl:LiBr:YCl_3=1:2:1$. These were ground and mixed in a mortar to prepare a mixture. The mixture was then milled in a planetary ball mill at 600 rpm for 12 hours.

Thus, a halide solid electrolyte powder of Example 1 represented by the composition formula $Li_3YBr_2Cl_4$ was prepared.

[Preparation of Coated Active Material]

A powder of $Li(NiCoMn)O_2$ (hereinafter referred to as NCM) was dried under vacuum at 100° C. for 2 weeks. The NCM powder was then taken out from the drying apparatus in a dry atmosphere with a dew point of −30° C. or less.

In an argon glove box with a dew point of −60° C. or less, ethoxy lithium (manufactured by Kojundo Chemical Laboratory Co., Ltd.) and niobium pentaethoxide (manufactured by Kojundo Chemical Laboratory Co., Ltd.) were weighed in a mole ratio of 1:1 and were dissolved in super-dehydrated ethanol (manufactured by Wako Pure Chemical Co., Ltd.) to prepare a coating solution.

A tumbling granulation coating apparatus (FD-MP-01E manufactured by Powrex Corporation) was used to form a coating layer on the surface of the dried NCM particles.

The input of NCM, the stirring speed, and the liquid feed rate of the coating solution were 1 kg, 400 rpm, and 6.59 g/min, respectively. The input of the coating solution was adjusted to form a $LiNbO_3$ film with a thickness of 6 nm. The input of the coating solution was calculated from the specific surface area of the active material and the density of $LiNbO_3$. A series of steps using a tumbling granulation coating apparatus was performed in a dry atmosphere with a dew point of −30° C. or less.

After completion of the treatment for forming the coating layer, the prepared powder was put into an alumina crucible and was heat-treated in a pure oxygen atmosphere at 350° C. for 1 hour.

The powder after the heat treatment was taken out in a dry atmosphere with a dew point of −30° C. or less and was reground in an agate mortar. Thus, a coated active material of Example 1 (NCM coated with the coating layer) was prepared.

The coating material in the coating layer was $LiNbO_3$.

[Preparation of Positive-Electrode Material]

In an argon glove box with a dew point of −60° C. or less, a carbon conductive aid, the halide solid electrolyte of Example 1, and the coated active material of Example 1 were weighed in a weight ratio of 2:18:82. These were mixed in an agate mortar to prepare a positive-electrode material of Example 1.

Example 2

[Preparation of Halide Solid Electrolyte]

A halide solid electrolyte (NCM) powder of Example 2 was prepared in the same manner as in Example 1.

[Preparation of Coated Active Material]

The NCM powder was dried under vacuum at 100° C. for 2 weeks. The NCM powder was then heat-treated in a nitrogen atmosphere at 400° C. for 1 hour to dry the surface of the NCM particles. The NCM powder was taken out from the drying apparatus in a dry atmosphere with a dew point of −30° C. or less.

A coating layer was formed on the surface of the NCM particles in the same manner as in Example 1 except that the input of the coating solution was adjusted to form a $LiNbO_3$ film with a thickness of 2 nm. Thus, a coated active material of Example 2 was prepared.

[Preparation of Positive-Electrode Material]

A positive-electrode material of Example 2 was prepared in the same manner as in Example 1 except that the coated active material of Example 2 was used.

Example 3

A positive-electrode material of Example 3 was prepared in the same manner as in Example 2 except that the input of the coating solution was adjusted to form a $LiNbO_3$ film with a thickness of 6 nm.

Example 4

A positive-electrode material of Example 4 was prepared in the same manner as in Example 2 except that the input of the coating solution was adjusted to form a $LiNbO_3$ film with a thickness of 12 nm.

Comparative Example 1

[Preparation of Halide Solid Electrolyte]

A halide solid electrolyte (NCM) powder of Comparative Example 1 was prepared in the same manner as in Example 1.

[Preparation of Coated Active Material]

The NCM powder was dried under vacuum at 100° C. for 2 weeks. The NCM powder was then taken out from the drying apparatus in a dry atmosphere with a dew point of −30° C. or less.

In an argon glove box with a dew point of −60° C. or less, ethoxy lithium (manufactured by Kojundo Chemical Laboratory Co., Ltd.) and niobium pentaethoxide (manufactured by Kojundo Chemical Laboratory Co., Ltd.) were weighed in a mole ratio of 1:1 and were dissolved in super-dehydrated ethanol (manufactured by Wako Pure Chemical Co., Ltd.) to prepare a coating solution.

A tumbling granulation coating apparatus (FD-MP-01E manufactured by Powrex Corporation) was used to form a coating layer on the surface of the dried NCM particles.

The input of NCM, the stirring speed, and the liquid feed rate of the coating solution were 1 kg, 400 rpm, and 6.59 g/min, respectively. The input of the coating solution was adjusted to form a $LiNbO_3$ film with a thickness of 2 nm. The input of the coating solution was calculated from the specific surface area of the active material and the density of $LiNbO_3$. A series of steps using a tumbling granulation coating apparatus was performed in a dry atmosphere with a dew point of −30° C. or less.

After completion of the treatment for forming the coating layer, the prepared powder was put into an alumina crucible and was heat-treated in the air at 350° C. for 1 hour.

The powder after the heat treatment was taken out in the air and was reground in an agate mortar. Thus, a coated active material of Comparative Example 1 was prepared.

The coating material in the coating layer was $LiNbO_3$.

[Preparation of Positive-Electrode Material]

In an argon glove box with a dew point of −60° C. or less, a carbon conductive aid, the halide solid electrolyte of Comparative Example 1, and the coated active material of Comparative Example 1 were weighed in a weight ratio of 2:18:82. These were mixed in an agate mortar to prepare a positive-electrode material of Comparative Example 1.

Comparative Example 2

A positive-electrode material of Comparative Example 2 was prepared in the same manner as in Comparative Example 1 except that the input of the coating solution was adjusted to form a $LiNbO_3$ film with a thickness of 6 nm.

Comparative Example 3

A positive-electrode material of Comparative Example 3 was prepared in the same manner as in Comparative Example 1 except that the input of the coating solution was adjusted to form a $LiNbO_3$ film with a thickness of 12 nm.

[Preparation of Sulfide Solid Electrolyte]

In an argon glove box with a dew point of −60° C. or less in an Ar atmosphere, a $Li_2S$ powder and a $P_2S_5$ powder were weighed in a mole ratio of $Li_2S:P_2S_5=75:25$. These were ground and mixed in a mortar to prepare a mixture. The mixture was then milled in a planetary ball mill (P-7 manufactured by Fritsch GmbH) at 510 rpm for 10 hours. Thus, a glassy solid electrolyte was prepared. The glassy solid electrolyte was heat-treated at 270° C. for 2 hours in an inert atmosphere. Thus, a glass-ceramic sulfide solid electrolyte was prepared.

[Production of Secondary Battery]

Secondary batteries were produced using the halide solid electrolyte of Example 1, the positive-electrode materials of Examples 1 to 4 and Comparative Examples 1 to 3, and the sulfide solid electrolyte.

First, 80 mg of a sulfide solid electrolyte, 20 mg of a halide solid electrolyte, and 18 mg of a positive-electrode material were layered in this order in an insulating outer tube. The layered body was pressed at a pressure of 720 MPa to form a positive electrode and an electrolyte layer.

Metal In (thickness: 200 μm), metal Li (thickness: 300 μm), and metal In (thickness: 200 μm) were then layered in this order on the electrolyte layer on the side opposite to the side in contact with the positive electrode. The layered body was pressed at a pressure of 80 MPa to form a layered body composed of the positive electrode, the electrolyte layer, and a negative electrode A stainless steel current collector was then placed on the top and bottom of the layered body. A current collector lead was attached to each current collector.

Finally, the insulating outer tube was sealed with an insulating ferrule to insulate the inside of the outer tube from the outside air atmosphere. Thus, batteries of Examples 1 to 4 and Comparative Examples 1 to 3 were produced.

[Charge-Discharge Test]

The batteries of Examples 1 to 4 and Comparative Examples 1 to 3 were subjected to a charge-discharge test under the following conditions.

The batteries were placed in a thermostat at 25° C.

The batteries were charged with a constant current at a current value of 140 μA corresponding to 0.05 C rate (20 hour rate) with respect to its theoretical capacity, and the charging was completed at a voltage of 3.7 V.

The batteries were then discharged at the same current value of 140 μA corresponding to 0.05 C rate, and the discharging was completed at a voltage of 1.9 V.

The average discharge voltages of the batteries of Examples 1 to 4 and Comparative Examples 1 to 3 were thus measured. Table 1 shows the results.

[Surface Composition Analysis]

The coated active materials of Examples 1 to 4 and Comparative Examples 1 to 3 were used in the following measurements.

Quantera SXM (manufactured by ULVAC-PHI, Inc.) was used for XPS surface composition analysis. The measurement conditions are as follows:

X-ray source: Al monochrome (25 W, 15 kV)
Analysis area: 300 μm×800 μm (Area)
Electron/ion flood gun: ON
Photoelectron take-off angle: 45 degrees
The scan range of binding energy was from 0 to 1250 eV. The atomic concentrations of elements were calculated using software "MultiPak" available from ULVAC-PHI, Inc.

Elements selected for measurement were Li (scan range: 45 to 65 eV), C (scan range: 275 to 295 eV), O (scan range: 522 to 542 eV), Mn (scan range: 632 to 662 eV), Co (scan range: 770 to 810 eV), Ni (scan range: 848 to 888 eV), and Nb (scan range: 195 to 215 eV). For the atomic concentration of each element, the surface concentration of the element was calculated from the integrated peak area ratio based on peaks observed in the scan range of the element. The ratio (C/Li) was then calculated as an atomic ratio from the calculated surface Li concentration and the calculated surface C concentration.

Thus, the atomic ratio (C/Li) of the carbon (C) content to the lithium (Li) content was determined in the region from the outermost surface of the coated active material to a depth of 10 nm. Table 1 shows the results.

The carbon (C) is derived from a carbonate (lithium carbonate, lithium hydrogen carbonate, etc.) contained in the coating layer. The carbonate is contained in the coating layer as a by-product.

TABLE 1

| | Heat treatment atmosphere | C/Li (atomic concentration/ atomic concentration) | Average discharge voltage (V) |
|---|---|---|---|
| Comparative example 1 | Air atmosphere | 1.74 | 3.575 |
| Comparative example 2 | Air atmosphere | 2.64 | 3.586 |
| Comparative example 3 | Air atmosphere | 1.35 | 3.570 |
| Example 1 | Pure oxygen atmosphere | 4.25 | 3.624 |
| Example 2 | Pure oxygen atmosphere | 3.27 | 3.640 |
| Example 3 | Pure oxygen atmosphere | 6.83 | 3.635 |
| Example 4 | Pure oxygen atmosphere | 3.64 | 3.625 |

DISCUSSIONS

As shown in Table 1, the coated active materials of Examples 1 to 4 had an atomic ratio (C/Li) of 4.25, 3.27, 6.83, and 3.64, respectively. All the coated active materials of Examples 1 to 4 had an atomic ratio (C/Li) of 3.27 or more. The batteries of Examples 1 to 4 had an average discharge voltage of 3.624 V or more. It was confirmed that the discharge voltage of the batteries could be improved by using a positive-electrode material with an atomic ratio (C/Li) of the carbon content to the lithium content in a surface layer portion of the coated active material being 3.27 or more.

In contrast, the atomic ratios (C/Li) of the coated active materials of Comparative Examples 1 to 3 were 1.74, 2.64, and 1.35, which were significantly lower than the values of Examples 1 to 4. The batteries of Comparative Examples 1 to 3 had an average discharge voltage of 3.586 V or less.

A battery according to the present disclosure can be used as an all-solid-state battery, for example.

What is claimed is:

1. A positive-electrode material comprising:
   a positive-electrode active material; and
   a coating layer covering the positive-electrode active material,
   wherein the coating layer contains lithium and carbon,
   the positive-electrode active material and the coating layer constitute a coated active material, and
   a ratio C/Li of a carbon content to a lithium content in a surface layer portion of the coated active material is 3.27 or more based on an atomic ratio.

2. The positive-electrode material according to claim 1, wherein the coating layer contains a carbonate.

3. The positive-electrode material according to claim 1, further comprising a solid electrolyte.

4. The positive-electrode material according to claim 3, wherein
   the solid electrolyte is represented by the following composition formula (1), $$Li_\alpha M_\beta X_\gamma \qquad \text{formula (1)}$$

where α, β, and γ are independently more than 0,
M includes at least one element selected from the group consisting of metal elements other than Li and metalloid elements, and
X includes at least one selected from the group consisting of F, Cl, Br, and I.

5. The positive-electrode material according to claim 4, wherein the M includes yttrium.

6. The positive-electrode material according to claim 4, satisfying $2.5 \leq \alpha \leq 3$, $1 \leq \beta \leq 1.1$, and $\gamma = 6$.

7. The positive-electrode material according to claim 4, wherein the X includes at least one selected from the group consisting of Cl and Br.

8. The positive-electrode material according to claim 1, wherein the coating layer contains a lithium niobate compound.

9. The positive-electrode material according to claim 1, wherein the positive-electrode active material contains Li and at least one element selected from the group consisting of Mn, Co, Ni, and Al.

10. A battery comprising:
   a positive electrode containing the positive-electrode material according to claim 1;
   a negative electrode; and
   an electrolyte layer between the positive electrode and the negative electrode.

11. The battery according to claim 10, wherein
   the positive-electrode material further contains a solid electrolyte, and
   the electrolyte layer contains a solid electrolyte with the same composition as that of the solid electrolyte contained in the positive-electrode material.

12. The battery according to claim 10, wherein
   the positive-electrode material further contains a solid electrolyte, and
   the electrolyte layer contains a halide solid electrolyte with a composition different from that of the solid electrolyte contained in the positive-electrode material.

13. The battery according to claim 10, wherein the electrolyte layer contains a sulfide solid electrolyte.

\* \* \* \* \*